(12) United States Patent
Sugiyama et al.

(10) Patent No.: US 9,024,502 B2
(45) Date of Patent: May 5, 2015

(54) STATOR FOR ROTATING ELECTRICAL DEVICE AND STATOR RETAINING RING

(75) Inventors: Toshiya Sugiyama, Okazaki (JP); Takashi Asaga, Toyota (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 384 days.

(21) Appl. No.: 13/477,887

(22) Filed: May 22, 2012

(65) Prior Publication Data
US 2012/0299436 A1 Nov. 29, 2012

(30) Foreign Application Priority Data

May 23, 2011 (JP) ................................. 2011-114513

(51) Int. Cl.
*H02K 5/00* (2006.01)
*H02K 1/18* (2006.01)

(52) U.S. Cl.
CPC ...................................... *H02K 1/185* (2013.01)

(58) Field of Classification Search
USPC .................... 310/216.001, 216.007, 216.009, 310/216.015, 216.113–216.114, 216.129, 310/216.131
See application file for complete search history.

(56) References Cited

U.S. PATENT DOCUMENTS

| | | | | |
|---|---|---|---|---|
| 7,586,227 B2 * | 9/2009 | Spaggiari | ........................ | 310/85 |
| 7,939,985 B2 * | 5/2011 | Yamada | ................. | 310/216.114 |
| 8,541,917 B2 * | 9/2013 | Sakuma et al. | ................. | 310/89 |
| 2010/0060099 A1 | 3/2010 | Sugiyama | | |
| 2012/0017425 A1 * | 1/2012 | Endo et al. | ....................... | 29/596 |
| 2012/0153768 A1 * | 6/2012 | Sanji et al. | ............. | 310/216.009 |

FOREIGN PATENT DOCUMENTS

| | | | | |
|---|---|---|---|---|
| CN | 101399471 | * | 4/2009 | ............... H02K 1/18 |
| JP | 2005-057932 A | | 3/2005 | |
| JP | 2005-312151 A | | 11/2005 | |
| JP | 2008-220157 | * | 9/2008 | ............... H02K 1/18 |
| JP | 2010-057260 A | | 3/2010 | |
| JP | 2010-068569 A | | 3/2010 | |
| JP | 2010-114951 A | | 5/2010 | |
| WO | 2010-119519 | * | 10/2010 | ............. H02K 15/14 |
| WO | 2011-101960 | * | 8/2011 | ............... H02K 5/04 |

OTHER PUBLICATIONS

English Machine Translation CN 101399471, Kunihiro et al., Apr. 2009.*
English Machine Tranlsation JP 2008-220157, Endo et al., Sep. 2008.*
Official Action issued by the Japan Patent Office on Feb. 17, 2015 in corresponding Japanese Application No. 2011-114513, and English language translation of Office Action (4 pages).

* cited by examiner

*Primary Examiner* — Burton Mullins
(74) *Attorney, Agent, or Firm* — Buchanan Ingersoll & Rooney PC (57) ABSTRACT

A stator for a rotating electrical device includes a stator retaining ring for the stator in a cylinder form that retains a plurality of cores. The stator retaining ring includes the cylinder portion where the cores are attached, and a plurality of fixing flanges where the stator retaining ring retains the housing with screws. A pair of through-holes representing a group of through-holes arranged near to one another extends through each of the fixing flanges. A separation distance β in the circumferential direction defined between the pair of the through-holes belonging to the same group of the through-holes is smaller relative to a separation distance γ in the circumferential direction defined between adjacent through-holes belonging to different groups of the through-holes.

8 Claims, 6 Drawing Sheets

STATOR FOR ROTATING ELECTRICAL DEVICE AND STATOR RETAINING RING

CROSS REFERENCE TO RELATED APPLICATIONS

This application is based on and claims priority under 35 U.S.C. §119 to Japanese Patent Application 2011-114513, filed on May 23, 2011, the entire content of which is incorporated herein by reference.

TECHNICAL FIELD

This disclosure generally relates to a stator for a rotating electrical device and a stator retaining ring.

BACKGROUND DISCUSSION

A patent reference JP2005-312151A, hereinafter referred to as Patent reference 1, discloses a known stator for a rotating electrical device provided with a flange portion for attaching a motor housing thereat formed at an end portion in an axial direction of a retaining ring where cores are attached. The stator disclosed in Patent reference 1 is adapted for motors mainly for driving wheels of a hybrid vehicle. The Patent reference 1 discloses the stator for a rotating electrical device where the cores arranged in an annular form are retained by the retaining ring first then the retaining ring is attached to an inside of the motor housing.

In the rotating electrical device disclosed in Patent reference 1, the flange portion extends outward in a radial direction from a peripheral end of the retaining ring and a multiple number of through-holes are arranged circumferentially with a predetermined separation distance defined between the through-holes provided on the flange portion. After bringing the flange portion in abutting contact with end surfaces of boss portions of the housing, bolts inserted to the corresponding through-holes are retained to the boss portions by tightening the bolts thereat so that the stator is retained to the housing.

Ordinarily, the housing of the rotational electrical device adapted for installation to a hybrid vehicle or similar type of vehicles is formed of a lightweight metal, for example, an aluminum alloy, for reducing weight. On the other hand, the retaining ring where the cores are attached by force fitting or similar methods is formed with a material similar to that for forming the cores, the material having a small thermal expansion coefficient, in order to avoid lowering of the retaining force for retaining the cores due to a temperature change. As a result, the retaining ring, in most cases, is formed with a material similar to iron, or in other words, with a metal different from which the housing is formed of.

The temperature change in the rotating electrical device causes the retaining ring and the housing to move relative to each other. For example, when the temperature of the rotating electrical device rises, the housing formed of a metal with a large thermal expansion coefficient expands outward in the radial direction more than the retaining ring. As a result, the boss portions of the housing move relative to the through-holes extending through the flange portion of the retaining ring, which in turn may cause loosening of the bolts tightened to the boss portions due to loads in shearing directions acting on the bolts in the stator. Especially after the generation of a fretting wear on a surface of the housing due to the relative movement between the flange portion and the boss portions, tightening forces of the bolts rapidly become weak.

As a countermeasure for preventing loosening of the bolts, the bolts having a larger pitch diameter of thread may be used for increasing axial forces acting on the bolts. Nevertheless, when the pitch diameter of thread for the bolts is increased, the flange portion of the retaining ring and the size of the housing become larger, which in turn results in increase of the size of the rotating electrical device as a whole.

A need thus exists for a stator for a rotating electrical device and a stator retaining ring which are not susceptible to the drawback mentioned above.

SUMMARY

According to an aspect of this disclosure, a stator for a rotating electrical device disposed radially outward and facing a rotor, the rotor rotatably attached to a housing, includes a stator retaining ring provided with fixing flanges extending outward in a radial direction from an end portion in an axial direction of a cylinder portion of the stator retaining ring, the stator retaining ring retaining the housing at the fixing flanges by screws. The stator for the rotating electrical device also includes a multiple number of cores, each of which being wound with a coil, arranged in an annular form and attached to an inner peripheral surface of the cylinder portion. Groups of through-holes extending through the fixing flanges are arranged in a state where a predetermined separation distance in a circumferential direction is defined between the groups of the through-holes where each of the groups of the through-holes includes a multiple number of the through-holes arranged near to one another through which screws are inserted. The through-holes are provided with a smaller separation distance in the circumferential direction defined between adjacent through-holes belonging to a same group of the through-holes relative to the separation distance in the circumferential direction defined between adjacent through-holes belonging to different groups of the through-holes.

According to another aspect of this disclosure, a stator retaining ring includes a cylinder portion with a multiple number of cores, each of which being wound with a coil, arranged in an annular form and attached to an inner peripheral surface of the cylinder portion. The stator retaining ring also includes fixing flanges extending outward in a radial direction from an end portion in an axial direction of the cylinder portion and configured to retain the housing thereat by screws. Groups of through-holes extending through the fixing flanges are arranged in a state where a predetermined separation distance in a circumferential direction is defined between the groups of the through-holes where each of the groups of the through-holes includes a multiple number of through-holes arranged near to one another through which screws are inserted. The through-holes are provided with a smaller separation distance in the circumferential direction defined between adjacent through-holes belonging to a same group of the through-holes relative to the separation distance in the circumferential direction defined between adjacent through-holes belonging to different groups of the through-holes.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
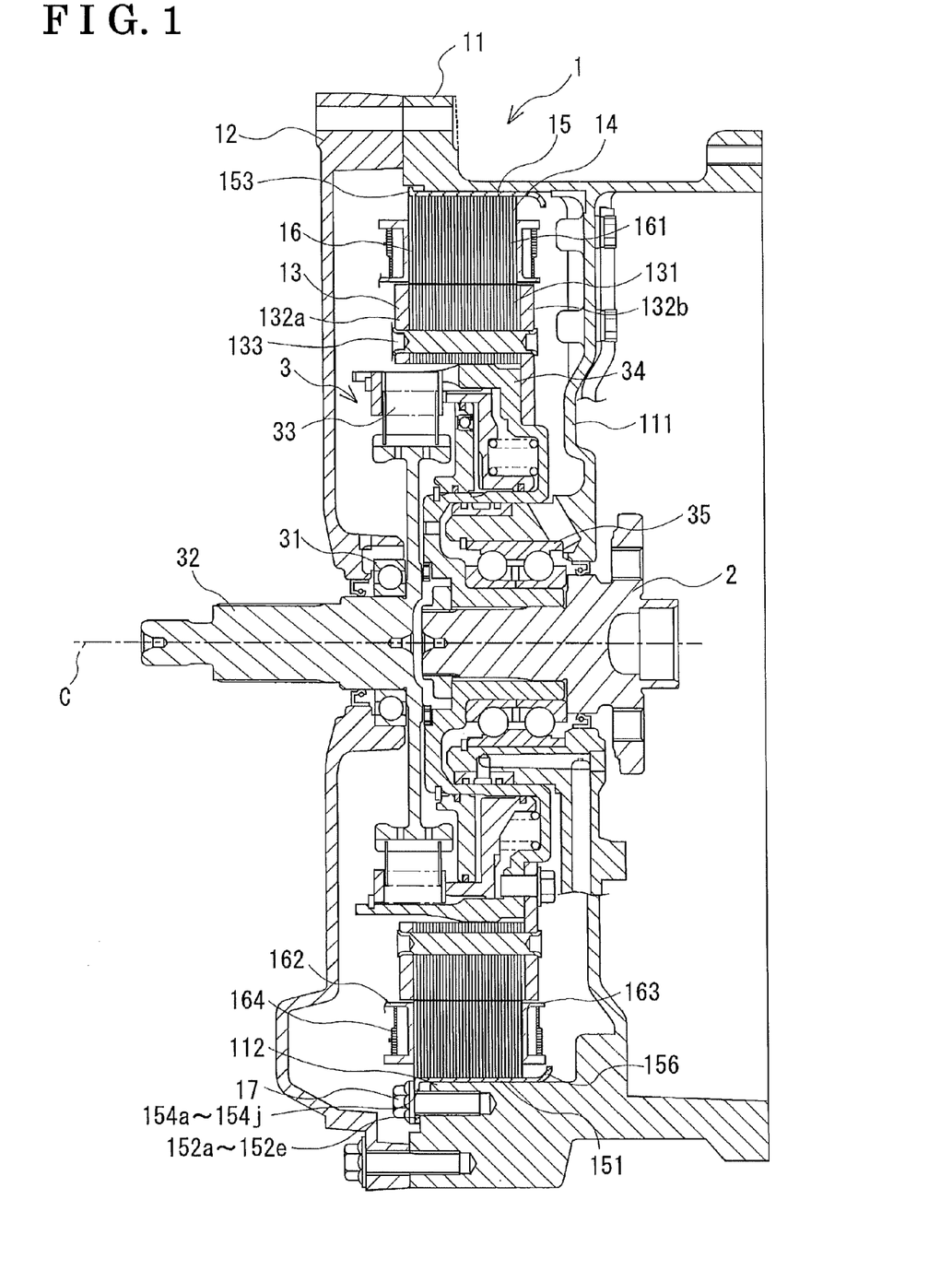
FIG. 1 is a cross-sectional view of an electric motor installed on a vehicle, the electric motor in which a first embodiment of a stator and a stator ring is provided.

A first embodiment will be described with references to FIGS. 1 through 7. An electric motor 1, which serves as a rotating electrical device, is a synchronous motor adapted for driving wheels of a hybrid vehicle. Nevertheless, applications of the first embodiment are not limited to such and may be applied to limitless types of electric motors, for example, a motor adapted for household appliances or a motor adapted for driving industrial machinery in general. For a purpose of description, a rotational axis direction, an axial direction, or similar expression refers to a direction along a rotational axis C of a rotor 13 included in the electric motor 1, which is shown in right and left directions of FIG. 1, unless otherwise described. In addition, a left direction of FIG. 1 is referred to as a frontward direction of the electric motor 1 and a clutch device 3 and a right direction of FIG. 1 is referred to as a rearward direction. Nevertheless, frontward and rearward directions in such occasions are irrelevant to the frontward and the rearward of an actual vehicle.

As FIG. 1 illustrates, a motor housing 11, which serves as a housing, is sealed with a motor cover 12 from the frontward direction with the rotor 13 and a stator 14 built-in. In the frontward direction of the motor cover 12, an engine adapted for a vehicle is attached and in the rearward direction of the motor housing 11 a transmission is arranged. The clutch device 3, which is a wet-type multiple disc clutch of a normally closed type, is disposed between the rotor 13, which is a component of the electric motor 1, and the engine. The electric motor 1 is connected to driving wheels of the vehicle via the transmission so that a driving force from the electric motor 1 is transmitted to the driving wheels as an input.

In the vehicle installed with the electric motor 1 illustrated in FIG. 1, the engine via the transmission rotates the driving wheels of the vehicle when the vehicle is driven by the engine. When the vehicle is driven by the electric motor 1, the electric motor 1 via the transmission rotates the driving wheels. When the vehicle is driven by the electric motor 1, the clutch device 3 is released so that the connection between the engine and the electric motor 1 is disconnected. Furthermore, the electric motor 1 driven by the engine via the clutch device 3 may function as a generator.

At the inner peripheral end of the motor cover 12, an input shaft 32 of the clutch device 3 is rotatably attached via a bearing 31 with the rotational axis C as the center. Likewise, the rotational axis C is the rotational axis of the engine and a turbine shaft 2 of the transmission. The input shaft 32 is connected to the crankshaft of the engine. The input shaft 32 is connected to a clutch outer portion 34 via an engagement portion 33 of the clutch device 3. An engagement and a disengagement at the engagement portion 33 respectively result in a connection and a disconnection between the input shaft 32 and the clutch outer portion 34. The clutch outer portion 34 connects to the rotor 13 of the electric motor 1. In addition, the clutch outer portion 34 extends inward in the radial direction and at the inner end thereof spline fits to the turbine shaft 2. Between the clutch outer portion 34 and a retaining wall 111 of the motor housing 11, a bearing device 35 is disposed so that the clutch outer portion 34 and the retaining wall 111 may rotate relative to each other.

The rotor 13 of the electric motor 1 is rotatably attached to the motor housing 11 via the clutch outer portion 34. The rotor 13 is formed by sandwiching a multiple number of electromagnetic steel sheets 131 in a layer with a pair of retaining plates 132a, 132b first, then riveting the ends of retaining members 133, which are inserted through the electromagnetic steel sheets 131 and the retaining plates 132a, 132b. A multiple number of magnets for providing field poles are provided on the periphery of the rotor 13. One of the retaining plates, which is the retaining plate 132b, is attached to the clutch outer portion 34 for connecting the rotor 13 to the clutch outer portion 34.

The stator 14 of the electric motor 1 facing the rotor 13 in the radial direction is attached to the inner peripheral surface of the motor housing 11. The stator 14 is formed with a multiple number of core bodies 16, which serve as cores, for generating a revolving magnetic field arranged in an annular form and attached to the inner peripheral surface of a cylinder portion 151 of a stator ring 15, which serves as a stator retaining ring.

Each of the core bodies 16 are provided with teeth 161 formed of multiple silicon steel sheets, or the electromagnetic steel sheets, stacked one on top the other. A pair of bobbins 162, 163 is fit to each other and is attached to each of the teeth 161 so as to surround an outer peripheral surface of the teeth 161. On the outside of the bobbins 162, 163 a coil 164 is wound for generating the revolving magnetic field. The coil 164 wound around each of the core bodies 16 is connected to an outside inverter via a bus ring. In the electric motor 1 provided with such configuration, the revolving magnetic field is generated at the stator 14 when the coils 164 are supplied with a three phase alternating current or similar form of power source. The rotor 13 rotates relative to the stator 14 due to an attraction force and a repulsion force induced by the revolving magnetic field being generated.

Figure 2:
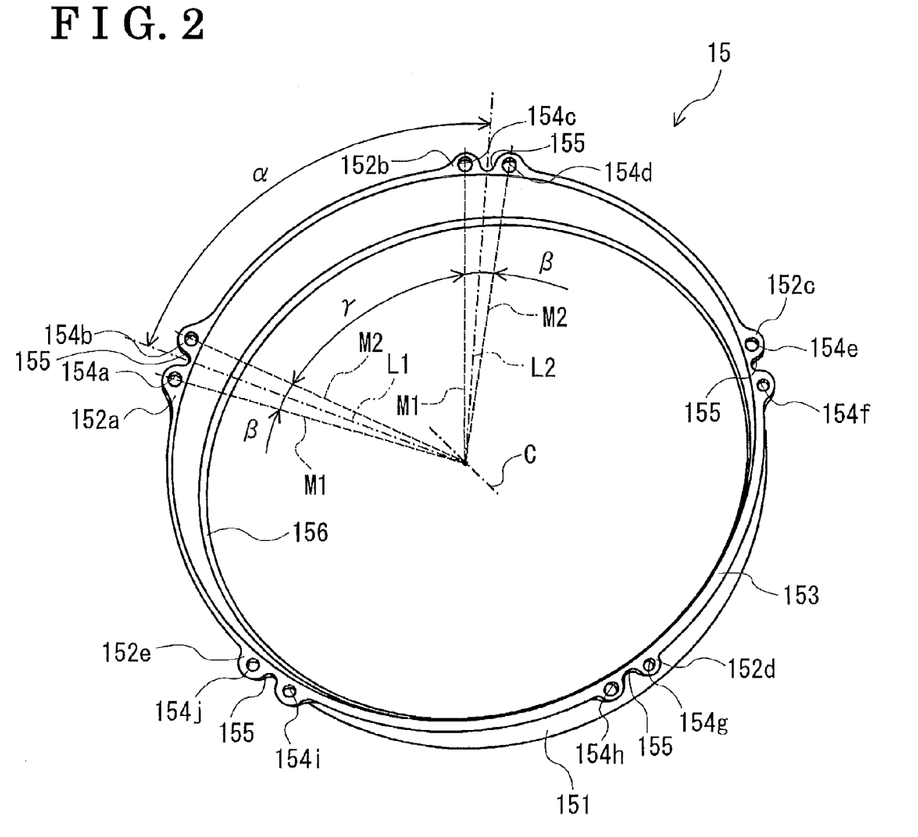
FIG. 2 is a perspective view of a stator ring for the electric motor shown in FIG. 1.

The stator ring 15 is formed by a steel sheet being pressed. As FIG. 2 illustrates, the stator ring 15 includes a cylinder portion 151 in a ring form and five fixing flanges 152a, 152b, 152c, 152d, 152e extending outward in the radial direction from an end portion in the axial direction of the cylinder portion 151. Hereinafter, reference numbers for the fixing flanges as a whole are indicated as 152a to 152e for convenience. The fixing flanges 152a to 152e, which are provided for attaching the stator 14 to the motor housing 11, are arranged so that each of the fixing flanges 152a to 152e is circumferentially distanced apart with a predetermined distance on a periphery of an end portion of the cylinder portion 151. Between the fixing flanges 152a to 152e, outer peripheral flanges 153, each of which having an extending amount less than the fixing flanges 152a to 152e, are formed.

Each pair of adjacent through-holes 154a, 154b, 154c, 154d, 154e, 154f, 154g, 154h, 154i, 154j extends through each of the fixing flanges 152a to 152e. Hereinafter, reference numbers for the through-holes as a whole are indicated as 154a to 154j for convenience. Each of the through-holes 154a to 154j is provided with diameters equal to one another. The through-holes 154a to 154j extend through the same position on each of the fixing flanges 152a to 152e so that each of the fixing flanges 152a to 152e is provided with the same forms to one another. The through-hole 154a and the through-hole 154b form a group of the through-holes 152a to 154j. Likewise, each pair of the through-holes 154a to 154j, that is the through-hole 154c and the through-hole 154d, the through-hole 154e and the through-hole 154f, the through-hole 154g and the through-hole 154h, and the through-hole 154i and the through-hole 154j, form the group of the through-holes 154a to 154j.

As FIG. 2 illustrates, the multiple number of the fixing flanges 152a to 152e, each of which having the pair of through-holes 154a to 154j extending through thereat, are arranged equally distanced apart on the periphery of the end portion of the cylinder portion 151. In other words, the multiple number of groups of the through-holes 154a to 154j, each group provided with the pair of the through-holes 154a to 154j, are arranged equally distanced apart on the periphery of the end portion of the cylinder portion 151. In FIG. 2, α represents an angular degree between a pair of straight lines L1, L2 separately drawn vertically from a midway point in the circumferential direction of the adjacent fixing flanges, for example the fixing flange 152a and the fixing flange 152b, to the rotational axis C. The midway point in the circumferential direction of the fixing flange 152a is the midway point between the through-hole 154a and the through-hole 154b. The midway point in the circumferential direction of the fixing flange 152b is the midway point between the through-hole 154c and the through-hole 154d. Hereinafter, α is referred to as a pitch between the flanges. α may be the pitch between the fixing flange 152b and the fixing flange 152c, between the fixing flange 152c and the fixing flange 152d, between the fixing flange 152d and the fixing flange 152e, or between the fixing flange 152e and the fixing flange 152a. In the first embodiment of this disclosure, α=72°.

β represents an angular degree between a pair of straight lines M1, M2 separately drawn vertically from the center of each of the adjacent through-holes 154a to 154j belonging to the same fixing flange 152a to 152e to the rotational axis C. Hereinafter, β is referred to as a pitch between bolts. β may be the pitch between the through-hole 154a and the through-hole 154b, between the through-hole 154c and the through-hole 154d, between the through-hole 154e and the through-hole 154f, between the through-hole 154g and the through-hole 154h, or between the through-hole 154i and the through-hole 154j.

γ represents an angular degree between a pair of straight lines M2, M1 separately drawn vertically from the center of each of the adjacent through-holes 154a to 154j belonging to different fixing flanges 152a to 152e adjacent to each other to the rotational axis C. The different fixing flanges 152a to 152e adjacent to each other may be the fixing flange 152a and the fixing flange 152b, the fixing flange 152b and the fixing flange 152c, the fixing flange 152c and the fixing flange 152d, the fixing flange 152d and the fixing flange 152e, or the fixing flange 152e and the fixing flange 152a. The adjacent through-holes 154a to 154j belonging to the different fixing flanges 152a to 152e may be the through-hole 154b and the through-hole 154c, the through-hole 154d and the through-hole 154e, the through-hole 154f and the through-hole 154g, the through-hole 154h and the through-hole 154i, or the through-hole 154j and the through-hole 154a.

As can be seen from FIG. 2, in the first embodiment of this disclosure, a relational expression of $\gamma > \beta$ is true between the aforementioned pitch β between the bolts, which is a separation distance defined in the circumferential direction between the through-holes 154a to 154j belonging to the same group of the through-holes 154a to 154j, and γ, a separation distance in the circumferential direction defined between adjacent through-holes 154a to 154j belonging to the different groups of the through-holes 154a to 154j. As an example, β, which represents the separation distance defined in the circumferential direction between the through-hole 154a and the through-hole 154b, is less than γ, which represents the separation distance defined in the circumferential direction between the through-hole 154b and the through-hole 154c. To further supplement the above description, the through-hole 154a and the through-hole 154b represent the pair of the through-holes 154a to 154j that extends through the same fixing flange 152a. Furthermore, the through-hole 154b represents the through-holes 154a to 154j that extends through the fixing flange 152a and the through-hole 154c represents the through-holes 154a to 154j that extends through another fixing flange 152b.

Figure 3:
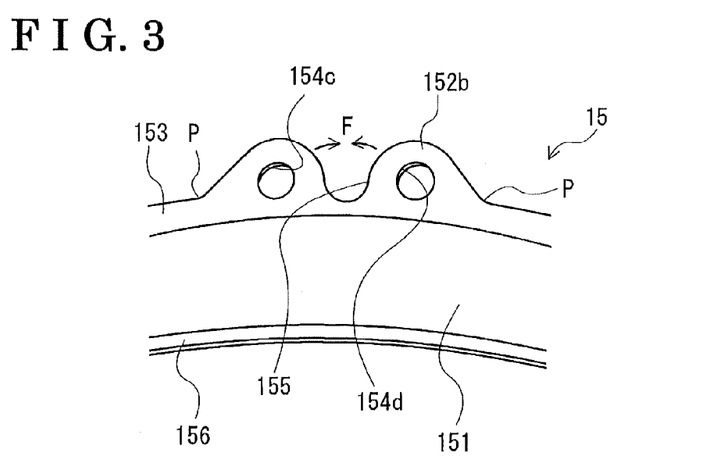
FIG. 3 is an enlarged view of a fixing flange of the stator ring shown in FIG. 2.

A relational expression of $\beta < \alpha/N$ is true between the pitch α between the flanges, the pitch β between the bolts, and N, where N represents the number of groups of the through-holes 154a to 154j provided on the periphery of the stator ring 15, or in other words, N represents the number of the fixing flanges 152a to 152e where the pair of the through-holes 154a to 154j extends through each of the fixing flanges 152a to 152e. N=5 in the first embodiment of this disclosure. Furthermore, as FIGS. 2 and 3 show, a slit 155, which serves as a recess, is formed on each of the fixing flanges 152a to 152e, the slit 155 extending in the radial direction from an outer periphery of the fixing flanges 152a to 152e between the adjacent through-holes 154a to 154j belonging to the same group of the through-holes 154a to 154j. In addition, on the cylinder portion 151, a reinforcement 156 extends inward throughout the whole periphery of the cylinder portion 151 at the end opposite to the end where the fixing flanges 152a to 152e are formed.

The multiple number of the core bodies 16 are shrink fitted to the inner peripheral surface of the cylinder portion 151. The stator ring 15 completed through the manufacturing process is heated to a predetermined temperature for expanding the inner diameter of the stator ring 15. With back yoke portions of the teeth 161 in abutting contact, the multiple number of the core bodies 16 arranged in the annular form are inserted to the cylinder portion 151 of the heated stator ring 15. After the multiple number of the core bodies 16 are inserted to the cylinder portion 151, the stator ring 15 is cooled and shrinks, thus each of the core bodies 16 are rigidly retained thereat. The core bodies 16 may be attached to the stator ring 15 by a force fit method under a normal temperature. For retaining the core bodies 16 to the stator ring 15 by the force fit method, an adhesive may be provided between the core bodies 16 and the cylinder portion 151 so that a retaining force therebetween may increase.

As FIG. 1 illustrates, the stator ring 15 with the core bodies 16 attached thereof is retained to the motor housing 11. After bringing the fixing flanges 152a to 152e and boss portions 112 of the motor housing 11 in abutting contact, bolts 17, serving as screws, or similar means, are inserted to the through-holes 154a to 154j and screwed to the boss portions 112, so that the fixing flanges 152a to 152e are attached to the motor housing 11.

With the stator ring 15 being retained to the motor housing 11, and electricity is provided to the electric motor 1, heat is produced at the stator 14 due to the rotation of the rotor 13. When the heat is produced, the difference of the thermal expansion coefficient between the motor housing 11 and the stator ring 15 causes the boss portions 112 of the motor housing 11 to start elongating outward in the radial direction relative to the fixing flanges 152a to 152e. Due to relative movements of the boss portions 112 relative to the fixing flanges 152a to 152e, loads in shearing directions act on each of the bolts 17 screwed to the corresponding boss portion 112. In the first embodiment of this disclosure, the loads in shearing directions are shared between a pair of the bolts 17 inserted to the corresponding fixing flange 152a to 152e, or in other words, shared between the bolts 17 belonging to the same group of the through-holes 154a to 154j. Most of the stresses by the elongation outward in the radial direction of the motor housing 11 may be absorbed at the portions of the motor housing 11 facing the portions of the stator ring 15 between the different fixing flanges 152a to 152e, or between the different groups of the through-holes 154a to 154j.

Figure 4:
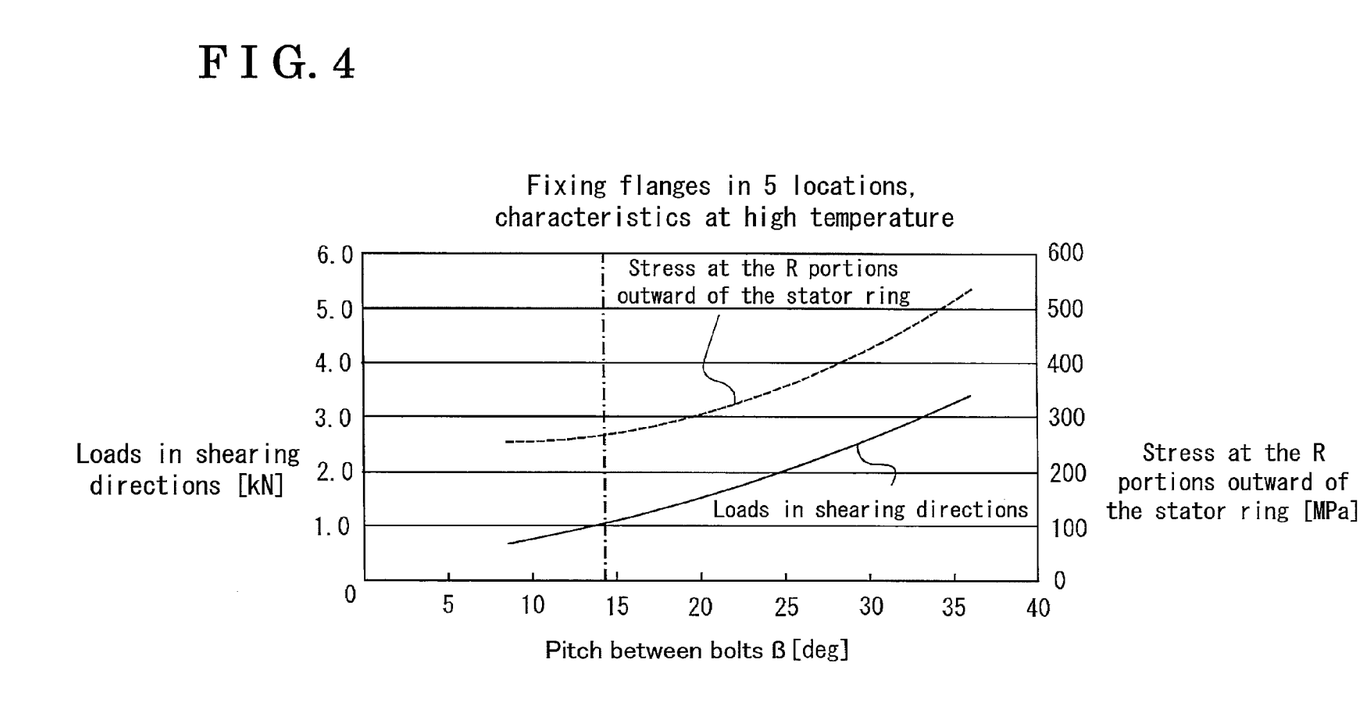
FIG. 4 is a graph showing characteristics of loads in shearing directions acting on bolts and stresses generated on the fixing flanges on a high temperature condition for the stator using the stator ring provided with five fixing flanges circumferentially arranged.
Figure 5:
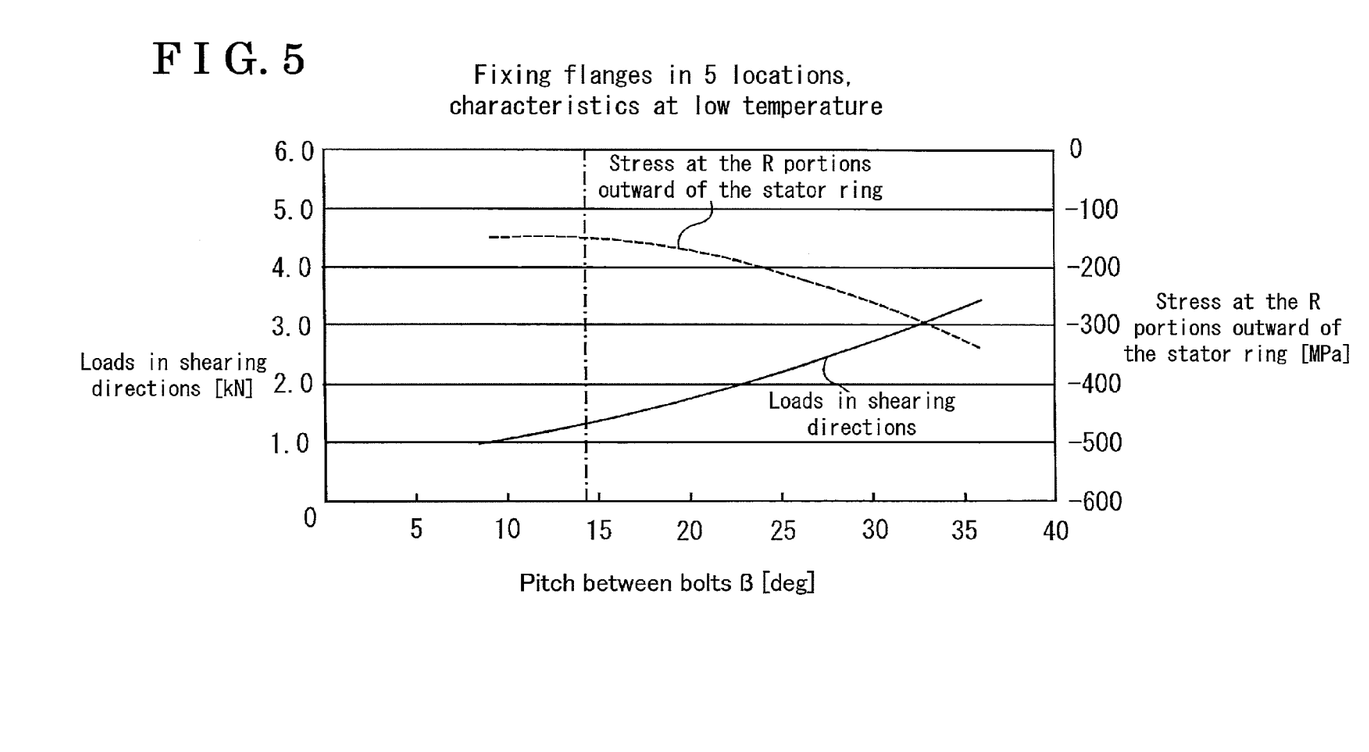
FIG. 5 is a graph showing characteristics of the loads in shearing directions and the stresses generated on a low temperature condition for the stator using the stator ring provided with five fixing flanges.

Each of FIGS. 4 and 5 illustrates characteristics of the loads in shearing directions acting on the bolts 17 when the pitch β between the bolts is changed and of stresses generated on the fixing flanges 152a to 152e at the R portions, which are the outward portion of the stator ring 15 indicated with reference alphabets P in FIG. 3, the characteristics obtained through a structural analysis using the Finite Element Method for the stator 14 using the stator ring 15 provided with five fixing flanges 152a to 152e arranged with equal separation distance therebetween at the end portion in the axial direction of the stator ring 15 on temperature conditions of high temperature, which is heated to 100° C., and of low temperature, which is cooled to −60° C. Each one of the fixing flanges 152a to 152e on the stator ring 15 being illustrated with the characteristics in FIGS. 4 and 5, and FIG. 6, which will be described later, is formed with the aforementioned slit 155.

Figure 6:
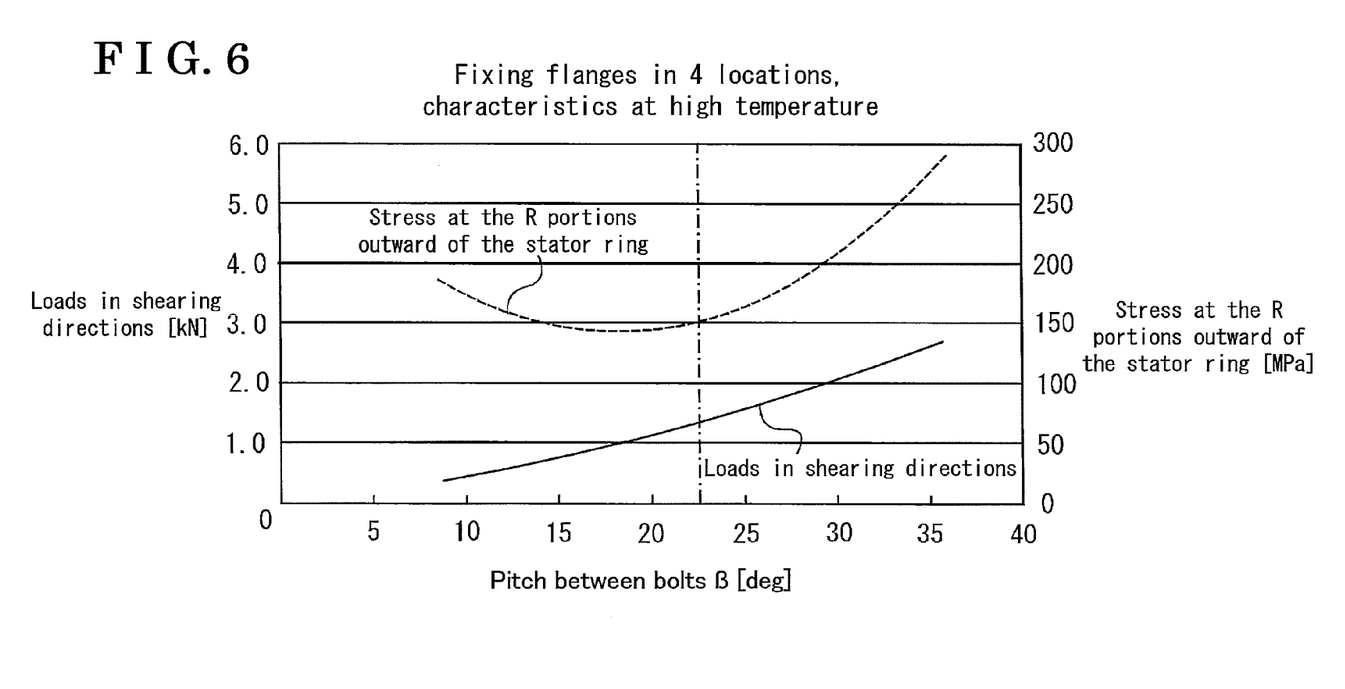
FIG. 6 is a graph showing characteristics of the loads in shearing directions and the stresses generated on the high temperature condition when four fixing flanges are provided.

According to the characteristics illustrated in FIGS. 4 and 5, providing a value of β to be less than 14.4° (β<14.4°) that satisfies the relationship β<α/N, where α/N is also expressed as 360°/N², prevents both an increase of the loads in shearing directions acting on the bolts 17 and of the stresses generated on the fixing flanges 152a to 152e on both high and low temperature conditions. A dashed-dotted line in each of FIGS. 4 and 5 indicates the point where β=14.4°. Likewise, FIG. 6 illustrates, characteristics of the loads in shearing directions acting on the bolts 17 and of the stresses generated on the fixing flanges 152a to 152e for when the number of the fixing flanges 152a to 152e is four on the high temperature condition. From the characteristics illustrated in FIG. 6 also, providing a value of β to be less than 22.5° (β<22.5°) that satisfies the relationship β<α/N prevents both an increase of the loads in shearing directions acting on the bolts 17 and of the stresses generated on the fixing flanges 152a to 152e. A dashed-dotted line in FIG. 6 indicates the point where β=22.5°.

As a summary, when the pitch β between the bolts, or the pitch between the pair of the bolts 17 provided on each of the fixing flanges 152a to 152e, is set to be less than a predetermined angular degree, the loads in shearing directions acting on the bolts 17 is reduced by sharing the loads in shearing directions generated due to the temperature change in the stator 14 between the pair of the bolts 17, however, when the pitch β between the bolts is set to be too small, the stresses generated on the fixing flanges 152a to 152e increases. In the first embodiment in this disclosure, the value of β is set to satisfy the relationship of β<α/N so that both the loads in shearing directions acting on the bolts 17 and the stresses generated on the fixing flanges 152a to 152e may be reduced.

Figure 7:
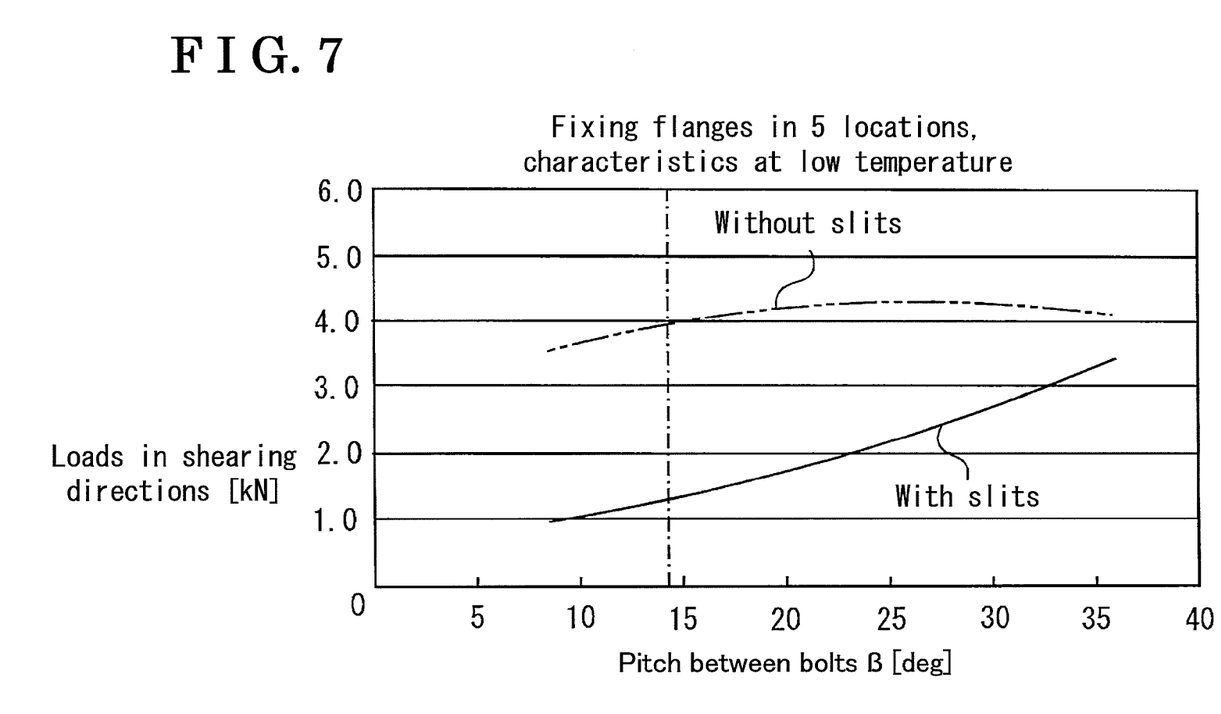
FIG. 7 is a graph showing characteristics of the loads in shearing directions acting on the bolts on the low temperature condition when five fixing flanges are provided where results are compared for when slits are provided for the fixing flanges and when slits are not provided.

When the temperature of the electric motor 1 becomes lower than the normal temperature and the motor housing 11 moves relative to the stator ring 15 to a direction inward in the radial direction, the loads in shearing directions acting on the bolts 17 and the stresses generated on the fixing flanges 152a to 152e may be reduced as the result of the slits 155, each of which extends between the adjacent through-holes 154a to 154j, which extend through the same fixing flange 152a to 152e, so that the adjacent through-holes 154a to 154j make movements for approaching each other, the movements indicated with reference alphabets F in FIG. 3. When the slits 155 are not formed between the adjacent through-holes 154a to 154j, which extend through the same fixing flange 152a to 152e, the stresses generated on the fixing flanges 152a to 152e increase on the low temperature condition and the loads in shearing directions acting on the bolts 17 significantly increase as shown in FIG. 7, compared with when the slits 155 are provided.

According to the first embodiment in this disclosure, the groups of the through-holes 154a to 154j are circumferentially arranged with a predetermined separation distance therebetween at the end portion in the axial direction of the stator ring 15. Each of the groups of the through-holes 154a to 154j is provided with the multiple number of the through-holes 154a to 154j arranged near to one another on the corresponding fixing flange 152a to 152e. As a result, when the loads in shearing directions are generated as a result of the temperature change in the stator 14, which in turn move the motor housing 11 and the through-holes 154a to 154j, which extend through the fixing flanges 152a to 152e, relative to each other, the loads in shearing directions are shared between the multiple number of the bolts 17 inserted to the through-holes 154a to 154j belonging to the same group of the through-holes 154a to 154j. Accordingly, the loads in shearing directions per bolt 17 are reduced, thus prevent loosening of the bolts 17.

A larger separation distance in the circumferential direction is provided between the adjacent through-holes 154a to 154j belonging to the different groups of the through-holes 154a to 154j compared with the separation distance in the circumferential direction between the adjacent through-holes 154a to 154j belonging to the same group of the through-holes 154a to 154j. As a result, the stresses due to the movement of the motor housing 11 relative to the fixing flanges 152a to 152e may be absorbed at the portions of the motor housing 11 facing the portions of the stator ring 15 between the adjacent groups of the through-holes 154a to 154j. When the loads in shearing directions per bolt 17 are reduced, the pitch diameter of thread for the bolts 17 may be kept to a current size, so that the sizes of the fixing flanges 152a to 152e of the stator ring 15 and the motor housing 11 may be prevented from becoming larger, which in turn prevents increasing the size of the electric motor 1 as a whole.

On each of the fixing flanges 152a to 152e the slit 155 provided with an arc-like form is formed, the slit 155 extending in the radial direction from the outer periphery of each of the fixing flanges 152a to 152e between the adjacent through-holes 154a to 154j belonging to the same group of the through-holes 154a to 154j. The slit 155 allows the adjacent through-holes 154a to 154j, which extend through the same fixing flange 152a to 152e, to approach each other when the temperature of the electric motor 1 becomes lower than the normal temperature and the motor housing 11 moves relative to the stator ring 15 to a direction inward in the radial direction. As a result, the stresses generated on the fixing flanges 152a to 152e are decreased and the loads in the shearing directions acting on the bolts 17 are reduced at the same time.

The groups of the through-holes 154a to 154j are arranged circumferentially at the end portion in the axial direction of the cylinder portion 151 with an equal separation distance defined between groups of the through-holes 154a to 154j where each of the groups of the through-holes 154a to 154j is provided with the pair of the through-holes 154a to 154j. The relational expression of $\beta<\alpha/N$ is true where $\beta$ represents the pitch between the bolts, which is the angular degree between the pair of straight lines M1, M2 separately drawn vertically from each of the pair of the through-holes 154a to 154j belonging to the same group of the through-holes 154a to 154j to the rotational axis C of the rotor 13, where $\alpha$ represents the pitch between the flanges, which is the angular degree between another pair of straight lines L1, L2 separately drawn vertically from a midway point in the circumferential direction between the pair of the through-holes 154a to 154j belonging to the same group of the through-holes 154a to 154j and from another midway point in the circumferential direction between the pair of the through-holes 154a to 154j belonging to the adjacent group of the through-holes 154a to 154j to the rotational axis C, and where N represents the number of the groups of the through-holes 154a to 154j formed at the end portion in the axial direction of the cylinder portion 151. As a result, loosening of the bolts 17 may be prevented by the reduction of the loads in shearing directions acting on the bolts 17 and the stresses generated at the fixing flanges 152a to 152e may be reduced at the same time when the motor housing 11 has moved relative to the stator ring 15 due to the temperature change in the stator 14.

Other embodiments according to this disclosure will be described next. The first embodiment according to this disclosure may be modified or enhanced in following manners. For example, considering the attachment strength of the stator 14 relative to the motor housing 11, an appropriate number of the fixing flanges 152a to 152e may be formed on the stator ring 15. The number of the through-holes 154a to 154j on each of the fixing flanges 152a to 152e may be three or more so that the pitch diameter of thread for the bolt 17 may be reduced.

The separation distance between the fixing flanges 152a to 152e adjacent to each other may be unequal. Each of the pitch $\alpha$ between the flanges, which is the angular degree between the straight lines L1, L2 separately drawn vertically from the midway point in the circumferential direction of the fixing flange 152a to 152e and from the midway point in the circumferential direction of the adjacent fixing flange 152a to 152e to the rotational axis C may be provided unequally by providing the fixing flanges 152a to 152e unevenly spaced therebetween. The material for forming the motor housing 11 where the stator ring 15 is attached may be a magnesium alloy, a titanium alloy, or a similar light metal. The electric motors 1 to which the embodiments of this disclosure are applied may be a synchronous electric motor, an induction motor, a DC motor, or any other types of rotating electrical device.

According to an aspect of this disclosure, the stator 14 for the electric motor 1 disposed radially outward and facing the rotor 13, the rotor 13 rotatably attached to the motor housing 11, includes the stator ring 15 provided with the fixing flanges 152a to 152e extending outward in the radial direction from the end portion in the axial direction of the cylinder portion 151 of the stator ring 15, the stator ring 15 retaining the motor housing 11 at the fixing flanges 152a to 152e by the bolts 17. The stator 14 for the electric motor 1 also includes the multiple number of the core bodies 16, each of which being wound with the coil 164, arranged in the annular form and attached to the inner peripheral surface of the cylinder portion 151. The groups of the through-holes 154a to 154j extending through the fixing flanges 152a to 152e are arranged in a state where the predetermined separation distance in the circumferential direction is defined between the groups of the through-holes 154a to 154j where each of the groups of the through-holes 154a to 154j includes the multiple number of the through-holes 154a to 154j arranged near to one another through which the bolts 17 are inserted. The through-holes 154a to 154j are provided with the smaller separation distance in the circumferential direction defined between adjacent through-holes 154a to 154j belonging to the same group of the through-holes 154a to 154j relative to the separation distance in the circumferential direction defined between adjacent through-holes 154a to 154j belonging to different groups of the through-holes 154a to 154j.

The stator 14 for the electric motor 1 is provided with the groups of the through-holes 154a to 154j, which are circumferentially arranged in the state where the predetermined separation distance is defined therebetween on the fixing flanges 152a to 152e. Each of the groups of the through-holes 154a to 154j is provided with the multiple number of the through-holes 154a to 154j arranged near to one another on the corresponding fixing flange 152a to 152e. Accordingly, when the loads in shearing directions are generated as a result of the temperature change in the stator 14, which in turn move the motor housing 11 and the through-holes 154a to 154j, which extend through the fixing flanges 152a to 152e, relative to each other, the loads in shearing directions are shared between the multiple number of the bolts 17 inserted to the through-holes 154a to 154j belonging to the same group of the through-holes 154a to 154j, so that the loads in shearing directions per bolt 17 are reduced, thus preventing loosening of the bolts 17. A larger separation distance in the circumferential direction is provided between the adjacent through-holes 154a to 154j belonging to the different groups of the through-holes 154a to 154j compared with the separation distance in the circumferential direction between the adjacent through-holes 154a to 154j belonging to the same group of the through-holes 154a to 154j. As a result, the stresses due to the movement of the motor housing 11 relative to the fixing flanges 152a to 152e may be absorbed at the portions of the motor housing 11 facing the portions of the stator ring 15 between the adjacent groups of the through-holes 154a to 154j. When the loads in shearing directions per bolt 17 are reduced, the pitch diameter of thread for the bolts 17 may be kept to a current size, so that the sizes of the fixing flanges 152a to 152e of the stator ring 15 and the motor housing 11 may be prevented from becoming larger, which in turn prevents increasing the size of the electric motor 1 as a whole.

According to another aspect or this disclosure, the stator 14 for the electric motor 1 is characterized by the slit 155 being formed on each of the fixing flanges the fixing flanges 152a to 152e, the slit 155 extending in the radial direction from the outer periphery of each of the fixing flanges 152a to 152e between the adjacent through-holes 154a to 154j belonging to the same group of the through-holes 154a to 154j.

On each of the fixing flanges 152a to 152e the slit 155 is formed, the slit 155 extending in the radial direction from the outer periphery of each of the fixing flanges 152a to 152e between the adjacent through-holes 154a to 154j belonging to the same group of the through-holes 154a to 154j. The slit 155 allows the adjacent through-holes 154a to 154j, which extend through the same fixing flange 152a to 152e, to approach each other when the temperature of the electric motor 1 is changed and the motor housing 11 moves relative to the stator ring 15 to the direction inward in the radial direction. As a result, the stresses generated on the fixing flanges 152a to 152e are decreased and the loads in the shearing directions acting on the bolts 17 are reduced at the same time.

According to further aspect of this disclosure, the stator 14 for the electric motor 1 is characterized by the groups of the through-holes 154a to 154j being arranged circumferentially at the end portion in the axial direction of the cylinder portion 151 with the equal separation distance defined between groups of the through-holes 154a to 154j where each of the groups of the through-holes 154a to 154j is provided with the pair of the through-holes 154a to 154j. The relational expression of $\beta<\alpha/N$ is true where $\beta$ represents the angular degree between a pair of straight lines M1, M2 separately drawn vertically from each of the pair of the through-holes 154a to 154j belonging to the same group of the through-holes 154a to 154j to the rotational axis C of the rotor 13, where $\alpha$ represents the angular degree between another pair of straight lines L1, L2 separately drawn vertically from the midway point in the circumferential direction between the pair of the through-holes 154a to 154j belonging to the same group of the through-holes 154a to 154j and from another midway point in the circumferential direction between the pair of the through-holes 154a to 154j belonging to the adjacent group of the through-holes 154a to 154j to the rotational axis C, and where N represents the number of the groups of the through-holes 154a to 154j formed at the end portion in the axial direction of the cylinder portion 151.

The groups of the through-holes 154a to 154j are arranged circumferentially at the end portion in the axial direction of the cylinder portion 151 with an equal separation distance defined between groups of the through-holes 154a to 154j where each group of the through-holes 154a to 154j is provided with the pair of the through-holes 154a to 154j. The relational expression of $\beta<\alpha/N$ is true where $\beta$ represents the angular degree between the pair of straight lines M1, M2 separately drawn vertically from each of the pair of the through-holes 154a to 154j belonging to the same group of the through-holes 154a to 154j to the rotational axis C of the rotor 13, where $\alpha$ represents the angular degree between another pair of straight lines L1, L2 separately drawn vertically from the midway point in the circumferential direction between the pair of the through-holes 154a to 154j belonging to the same group of the through-holes 154a to 154j and from another midway point in the circumferential direction between the pair of the through-holes 154a to 154j belonging to the adjacent groups of the through-holes 154a to 154j to the rotational axis C, and where N represents the number of the groups of the through-holes 154a to 154j formed at the end portion in the axial direction of the cylinder portion 151. As a result, loosening of the bolts 17 may be prevented by reducing the loads in shearing directions acting on the bolts 17 and the stresses generated at the fixing flanges 152a to 152e may be reduced at the same time when the motor housing 11 has moved relative to the stator ring 15 due to the temperature change in the stator 14.

According to further aspect of this disclosure, the stator 14 for the electric motor 1 is characterized by the through-holes 154a to 154j belonging to the groups of the through-holes 154a to 154j being provided with diameters equal to one another and are extending through the fixing flanges 152a to 152e provided with the same form to one another.

Accordingly, when the loads in shearing directions are generated as the result of the temperature change in the stator 14, which in turn move the motor housing 11 and the through-holes 154a to 154j, which extend through the fixing flanges 152a to 152e, relative to each other, the loads in shearing directions are reduced, thus prevents loosening of the bolts 17.

According to another aspect of this disclosure, the stator 14 for the electric motor 1 is characterized by a relational expression of $\beta<360°/N^2$ being true where N represents the number of groups of the through-holes 154a to 154j.

Accordingly, when the relational expression of $\beta<360°/N^2$ is true, where N represents the number of groups of the through-holes 154a to 154j, loosening of the bolts 17 may be prevented by reducing the loads in shearing directions acting on the bolts 17 and the stresses generated at the fixing flanges 152a to 152e may be reduced at the same time when the motor housing 11 has moved relative to the stator ring 15 due to the temperature change in the stator 14.

According to further aspect of this disclosure, the stator 14 for the electric motor 1 is characterized by a relational expression of $\beta<22.5°$ being true for the angular degree $\beta$.

Accordingly, when the relational expression of $\beta<22.5°$ is true for the angular degree $\beta$, loosening of the bolts 17 may be prevented by reducing the loads in shearing directions acting on the bolts 17 and the stresses generated at the fixing flanges 152a to 152e may be reduced at the same time when the motor housing 11 has moved relative to the stator ring 15 due to the temperature change in the stator 14.

According to another aspect of this disclosure, the stator 14 for the electric motor 1 is characterized by the stator ring 15 being arranged with the reinforcement 156 extending inward in the radial direction on the end opposite to the end where the fixing flanges 152a to 152e are formed.

The reinforcement 156 is formed on the stator ring 15 for increasing the strength of the stator ring 15 at the retained portion of the stator ring 15 relative to the motor housing 11. Accordingly, the rigidity of the stator ring 15 at the retained portion of the stator ring 15 relative to the motor housing 11 is enhanced, so that the durability and reliability of the electric motor 1 is improved. Furthermore, the reinforcement 156 provides easier force fitting of the stator ring 15 relative to the motor housing 11.

According to further aspect of this disclosure, the stator 14 for the electric motor 1 is characterized by each of the slits 155 extending in the radial direction from the outer periphery of each of the fixing flanges 152a to 152e being provided with an arc-like form.

The slit 155 provided with the arc-like form allows the adjacent through-holes 154a to 154j, which extend through the same fixing flange 152a to 152e, to approach each other when the temperature of the electric motor 1 is changed and the motor housing 11 moves relative to the stator ring 15 to a direction inward in the radial direction. As a result, the stresses generated on the fixing flanges 152a to 152e are decreased and the loads in the shearing directions acting on the bolts 17 are reduced at the same time.

According to another aspect of this disclosure, the stator ring 15 includes the cylinder portion 151 with the multiple number of the core bodies 16, each of which being wound with the coil 164, arranged in the annular form and attached to the inner peripheral surface of the cylinder portion 151. The stator ring 15 also includes the fixing flanges 152a to 152e extending outward in the radial direction from the end portion in the axial direction of the cylinder portion 151 and configured to retain the motor housing 11 thereat by the bolts 17. The groups of the through-holes 154a to 154j extending through the fixing flanges 152a to 152e are arranged in the state where the predetermined separation distance in the circumferential direction is defined between the groups of the through-holes 154a to 154j where each of the groups of the through-holes 154a to 154j includes the multiple number of the through-holes 154a to 154j arranged near to one another through which the bolts 17 are inserted. The through-holes 154a to 154j are provided with the smaller separation distance in the circumferential direction defined between adjacent through-holes 154a to 154j belonging to the same group of the through-holes 154a to 154j relative to the separation distance in the circumferential direction defined between adjacent through-holes 154a to 154j belonging to different groups of the through-holes 154a to 154j.

The stator ring 15 is provided with groups of the through-holes 154a to 154j, which are circumferentially arranged in the state where the predetermined separation distance is defined therebetween on the fixing flanges 152a to 152e. Each of the groups of the through-holes 154a to 154j is provided with the multiple number of the through-holes 154a to 154j arranged near to one another on the corresponding fixing flange 152a to 152e. Accordingly, when the loads in shearing directions are generated as a result of the temperature change in the stator 14, which in turn move the motor housing 11 and the through-holes 154a to 154j, which extend through the fixing flanges 152a to 152e, relative to each other, the loads in shearing directions are shared between the multiple number of the bolts 17 inserted to the through-holes 154a to 154j belonging to the same group of the through-holes 154a to 154j, so that the loads in shearing directions per bolt 17 are reduced, thus prevents loosening of the bolts 17. A larger separation distance in the circumferential direction is provided between the adjacent through-holes 154a to 154j belonging to different groups of the through-holes 154a to 154j compared with the separation distance in the circumferential direction between the adjacent through-holes 154a to 154j belonging to the same group of the through-holes 154a to 154j. As a result, the stresses due to the movement of the motor housing 11 relative to the fixing flanges 152a to 152e may be absorbed at the portions of the motor housing 11 facing the portions of the stator ring 15 between the adjacent groups of the through-holes 154a to 154j. Because the pitch diameter of thread for the bolts 17 may be kept to a current size, the sizes of the fixing flanges 152a to 152e of the stator ring 15 and the motor housing 11 may be prevented from becoming larger, which in turn prevents increasing the size of the electric motor 1 as a whole.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A stator for a rotating electrical device disposed radially outward and facing a rotor, the rotor rotatably attached to a housing, comprising:
   a stator retaining ring provided with fixing flanges extending outward in a radial direction from an end portion in an axial direction of a cylinder portion of the stator retaining ring, the stator retaining ring being fixed to the housing at the fixing flanges by screws; and
   a plurality of cores, each wound with a coil, arranged in an annular form and attached to an inner peripheral surface of the cylinder portion, wherein
   groups of through-holes extending through the fixing flanges are arranged in a state where a predetermined separation distance in a circumferential direction is defined between the groups of the through-holes where each of the groups of the through-holes includes a plurality of the through-holes arranged near to one another through which the screws are inserted, and wherein
   adjacent ones of the through-holes belonging to a same group are separated by a separation distance in the circumferential direction that is smaller than the separation distance in the circumferential direction separating adjacent ones of the through-holes belonging to different groups of the through-holes,
   wherein a recess is formed on each of the fixing flanges, the recess extending in the radial direction from an outer periphery of each of the fixing flanges between the adjacent through-holes belonging to the same group of the through-holes.

2. The stator for the rotating electrical device according to claim 1, wherein the groups of the through-holes are arranged circumferentially at the end portion in the axial direction of the cylinder portion with an equal separation distance defined between groups of the through-holes where each of the groups of the through-holes is provided with a pair of the through-holes, and wherein
   $\beta < \alpha/N$, where $\beta$ represents an angular degree between a pair of straight lines extending vertically from each of the pair of the through-holes belonging to the same group of the through-holes to a rotational axis of the rotor, where $\alpha$ represents an angular degree between another pair of straight lines extending vertically from a midway point in the circumferential direction between the pair of the through-holes belonging to the same group of the through-holes and from another midway point in the circumferential direction between the pair of the through-holes belonging to the adjacent group of the through-holes to the rotational axis, and where N represents a number of the groups of the through-holes formed at the end portion in the axial direction of the cylinder portion.

3. The stator for the rotating electrical device according to claim 2, wherein $\beta < 360°/N^2$, where N represents the number of groups of the through-holes.

4. The stator for the rotating electrical device according to claim 2, wherein $\beta < 22.5°$ for the angular degree $\beta$.

5. The stator for the rotating electrical device according to claim 1, wherein the through-holes belonging to the groups of the through-holes possess equal diameters and extend through the fixing flanges so that the fixing flanges possess the form.

6. The stator for the rotating electrical device according to claim 1, wherein the stator retaining ring is arranged with a reinforcement extending inward in the radial direction on an end opposite to the end where the fixing flanges are formed.

7. The stator for the rotating electrical device according to claim 1, wherein each of the recesses extending in the radial direction from the outer periphery of each of the fixing flanges are provided with an arc-like form.

8. A stator retaining ring, comprising:
   a cylinder portion with a plurality of cores, each wound with a coil, arranged in an annular form and attached to an inner peripheral surface of the cylinder portion; and
   fixing flanges extending outward in a radial direction from an end portion in an axial direction of the cylinder portion and configured to be fixed to the housing by screws; wherein groups of through-holes extending through the fixing flanges are arranged in a state where a predetermined separation distance in a circumferential direction is defined between the groups of the through-holes where each of the groups of the through-holes includes a plurality of the through-holes arranged near to one another through which screws are inserted, and wherein adjacent ones of the through-holes belonging to a same group are separated by a separation in the circumferential direction that is smaller than the separation distance in the circumferential direction separating adjacent ones of the through-holes belonging to different groups of the through-holes, wherein a recess is formed on each of the fixing flanges, the recess extending in the radial direction from an outer periphery of each of the fixing flanges between the adjacent through-holes belonging to the same group of the through-holes.

\* \* \* \* \*